(12) United States Patent
Curran et al.

(10) Patent No.: US 7,170,947 B2
(45) Date of Patent: Jan. 30, 2007

(54) DATA RECEIVER

(75) Inventors: Philip Curran, Dublin (IE); Stephen Bates, Dublin (IE); Vincent Berg, Dublin (IE)

(73) Assignee: Massana Research Limited, Dublin (IE)

( * ) Notice: Subject to any disclaimer, the term of this patent is extended or adjusted under 35 U.S.C. 154(b) by 761 days.

(21) Appl. No.: 10/196,190

(22) Filed: Jul. 17, 2002

(65) Prior Publication Data

US 2003/0039316 A1  Feb. 27, 2003

Related U.S. Application Data

(60) Provisional application No. 60/305,861, filed on Jul. 18, 2001.

(51) Int. Cl.
*H04L 23/02* (2006.01)
*H04L 7/02* (2006.01)

(52) U.S. Cl. .................. 375/265; 370/20; 375/261; 375/298; 375/316; 455/60

(58) Field of Classification Search ............ 375/137, 375/147, 262, 316, 341, 348, 350, 265, 298, 375/261; 370/20; 455/60
See application file for complete search history.

(56) References Cited

U.S. PATENT DOCUMENTS

| | | | |
|---|---|---|---|
| 5,430,744 A * | 7/1995 | Fettweis et al. | 714/795 |
| 5,602,583 A * | 2/1997 | Citta | 348/21 |
| 6,038,269 A | 3/2000 | Raghavan | 375/340 |
| 6,185,249 B1 * | 2/2001 | Drucker et al. | 375/222 |
| 6,192,038 B1 * | 2/2001 | Wallerius et al. | 370/328 |
| 6,201,831 B1 * | 3/2001 | Agazzi et al. | 375/229 |
| 6,236,645 B1 | 5/2001 | Agazzi | 370/286 |
| 6,253,345 B1 * | 6/2001 | Agazzi et al. | 714/752 |
| 6,327,317 B1 * | 12/2001 | Chennakeshu et al. | 375/341 |
| 6,477,200 B1 * | 11/2002 | Agazzi et al. | 375/233 |
| 6,690,754 B1 * | 2/2004 | Haratsch et al. | 375/346 |
| 6,724,844 B1 * | 4/2004 | Ghosh | 375/350 |
| 6,823,483 B1 * | 11/2004 | Creigh | 714/701 |
| 6,865,234 B1 * | 3/2005 | Agazzi | 375/265 |

(Continued)

FOREIGN PATENT DOCUMENTS

EP   0601414 A1   12/1994

(Continued)

OTHER PUBLICATIONS

Haratsch et al, IEEE Jour Of Solid-State Cir, vol. 36, No. 3, Mar. 2001, A 1-Gb/s Joint Equalizer and Trellis Decoder for . . . .

(Continued)

*Primary Examiner*—Mohammed Ghayour
*Assistant Examiner*—Erin M. File
(74) *Attorney, Agent, or Firm*—Jacobson Holman PLLC

(57) ABSTRACT

A receiver (1) has an equalizer (2, 4, 5) which introduces inter symbol interferance (ISI) in a controlled manner and low pass filters to reduce noise. The ISI is introduced and the noise is reduced by a filter (4) in an adaptation path. A trellis decoder (3) of the receiver (1) removes the ISI to avoid propagation error. It does this in front end modules (20), outside of its critical path. There is a better decoder performance because noise is smaller.

12 Claims, 4 Drawing Sheets

U.S. PATENT DOCUMENTS

| | | | |
|---|---|---|---|
| 6,999,521 B1 * | 2/2006 | Azadet et al. | 375/262 |
| 2001/0035994 A1 * | 11/2001 | Agazzi et al. | 359/152 |
| 2002/0006173 A1 * | 1/2002 | Agazzi et al. | 375/340 |
| 2002/0083396 A1 * | 6/2002 | Azadet et al. | 714/796 |

FOREIGN PATENT DOCUMENTS

| | | |
|---|---|---|
| EP | 0801484 | 10/1997 |
| WO | WO00/44142 | 7/2000 |

OTHER PUBLICATIONS

Haratsch et al, IEEE Custom Integ Cir Conf, 2000, pp. 465-468, A Low Complexity Joint Equalizer and Decoder for 1000Base-T . . . .

Hatamian et al, IEEE Custom Integ Cir Conf, 1998, pp. 335-342, Design Considerations for Gigabit Ethernet 1000Base-T Twisted . . . .

* cited by examiner

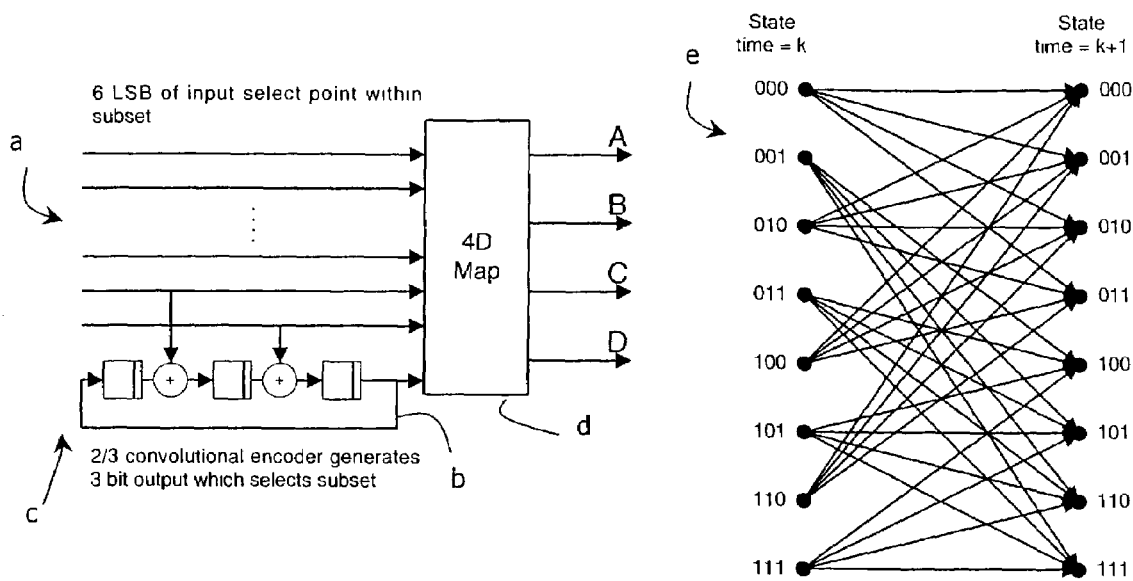
Fig. A
PRIOR ART
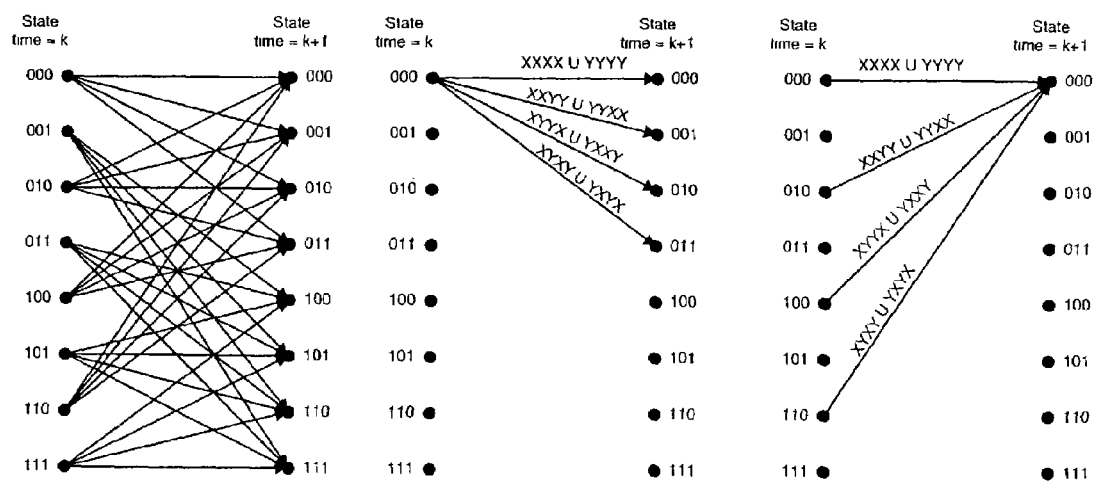
Fig. B
PRIOR ART

DATA RECEIVER

This is a complete application claiming benefit of provisional 60/305,861 filed Jul. 18, 2001.

FIELD OF THE INVENTION

The invention relates to a data receiver particularly for high bandwidth communication such as that of the 1000BASE-T ("Gigabit") standard. Such a receiver is described for example in U.S. Pat. No. 6,236,645B1 (Broadcom).

PRIOR ART DISCUSSION

In such receivers the received signal (analog) is processed by various analog and digital circuits including a feed forward equaliser (FFE). Typically, the analog circuits and the cable introduce a noise component "n" into the digital signal, comprising a combination of inter-symbol-interference (ISI), quantization noise, and other noise sources. One of the major components on the receiver's digital side is a trellis decoder, which performs decoding of convolutional encoding in the transmitter at the far end of the cable. The purpose of the convolutional encoding is to add coding gain into the system. It does this by adding a ninth bit to the inputted eight bits so that a map can generate the symbols (-2, -1, 0, +1, +2) in four channels ("dimensions") A, B, C, & D with a relatively large voltage separation of 0.5V. Convolutional encoding ensures that the ninth bit is drawn from a set of allowed values, and this imposes a structure on the transmitted sequence. A receiver can take advantage of this structure in order to improve its performance.

In more detail, and referring to Fig. A, the transmitter's eight input lines are indicated by "a", and a ninth input "b" is provided by a convolutional encoder "c". The nine bits are mapped to the available symbols in the four dimensions by a 4D map "d". The diagram on the right of Fig. A illustrates typical convolutional encoding between time state "k" and time state "k+1".

Since the convolutional code introduces memory there are only certain sequences of convolutional encoder output that are possible. These are shown as a trellis "e" in Fig. A. Each arrow represents a different possible output from a given state. The state is defined by shift register contents in the convolutional encoder. The mapping block "d" is defined in the IEEE 802.3ab standard for 1000BASE-T.

In 1000BASE-T because there are four dimensions and there are five signalling levels per channel, and so there are 625 possible 4D symbols. To transmit 108 bits per second at $125*10^6$ symbols per second requires only 256 different symbols. 512 of the 625 symbols are taken and these are divided into 8 subsets (labelled D0 to D7). The subsets are defined in terms of their member 4D symbols which are in turn composed of 4 1D symbols. The 1D symbols can be in one of two sets which we define as $X=\{-1,+1\}$ and $Y=\{-2,0,2\}$. The definitions of the 8 subsets can then be given in terms of Xs and Ys.

| Subset | Definition | Possible members |
|---|---|---|
| 0 | XXXXYYYY | 97 |
| 1 | XXXYYYYX | 78 |
| 2 | XXYYYYXX | 72 |
| 3 | XXYXYYYXY | 78 |
| 4 | XYYXYYXXY | 72 |
| 5 | XYYYYXXX | 78 |
| 6 | XYXYYYXYX | 72 |
| 7 | XYXXYYXYY | 78 |

Only 64 members are required per subset and so those members with most energy are discarded. This shaping of the transmitted signal introduces a gain of about 0.43 dB over uniformly distributed levels. It is worth noting that in start-up only YYYYs are transmitted. Since this is a valid subset the Viterbi can be run during start-up.

Referring to Fig. B, the trellis diagram for a single step in the 1000BASE-T code (left) is illustrated. The possible transitions from state 000 (middle) are illustrated. The possible entries into state 000 are shown on the right hand side. U stands for union and $X=\{-1,+1\}$, $Y=\{-2,0,+2\}$.

A 1000BASE-T transmitter must implement the 1000BASE-T convolutional code that can be shown to give a coding gain of up to approximately 5.5 dB if decoded in an optimal fashion. Therefore it makes sense to include a decoder in the receiver that can utilise some or all of this 5.5 dB because it is less expensive in terms of area and power than trying to obtain the 5.5 dB from other means.

The code is designed in such a way that the decoder can be operated at all times and resides on the data path of the receiver. No special training or resets are required other than to ensure that the decoder resets to a known state when the reset input is high. In addition, transitions between IDLE and DATA are transparent to the Viterbi decoder and whilst errors can occur they should be short lived and non-catastrophic. Another point worth noting is that the Viterbi module can even be run before the eye is open as long as its outputs are ignored. As soon as the inputs improve the Viterbi decoder is very quick to provide some or all of the coding gain. In addition in start-up the Viterbi module is insensitive to dimension crossovers and bulk delay mismatches across the four dimensions.

While convolutional encoding is relatively simple, decoding at the receiver is certainly not so and detailed implementations are not specified in the IEEE 802.3ab standards for 1000BASE-T. A major consideration for development of a trellis decoder is that, while the decoder may operate in an ISI environment, doing so fundamentally limits its performance. A possible approach to addressing this problem is to eliminate ISI noise in the FFE, thus allowing use of a simple trellis decoder with good performance. However, this approach suffers from the problem of placing constraints on the frequency response of the FFE.

Another approach is described in PCT Patent Specification No. WO00/44142 (Broadcom). This involves use of a DFE (decision feedback equaliser) operatively responsive to tentative decisions made by the Viterbi decoder. This reduces ISI, however, a problem is that it adds complex signal processing in the time critical path of the decoder and thus adds considerable extra complexity to the receiver.

A further approach is described in U.S. Pat. No. 6,038,269 (National Semiconductor). A detector comprises a branch metric generator, an add-compare-select unit, traceback circuitry, a last-in-first-out buffer, and a starting state determiner. The detector estimates the transmitted data sequence from the sequence of received signals. While this approach is apparently effective, it also appears to suffer from the problem of increasing the number of states and thus increases complexity.

It is well known to use the Viterbi algorithm for equalisation only, one example of which is EP0801484 (Silicon Systems). This does not address combined equalisation and decoding.

The invention is therefore directed towards providing a receiver for equalisation and decoding which deals with noise-induced problems in a more optimum manner.

SUMMARY OF THE INVENTION

According to the invention, there is provided a receiver for high bandwidth data communication of the type in which there is convolutional encoding in received signals, the receiver comprising an equaliser and a trellis decoder, characterised in that;

the equaliser comprises means for introducing ISI in a controlled manner; and the decoder comprises means for removing the ISI to avoid error propagation.

In one embodiment, the decoder comprises means for removing the ISI using computation outside of the critical path of the decoder.

In another embodiment, the decoder comprises means for removing the ISI in a front end block.

In a further embodiment, the front end block comprises means for computing a one-dimensional distance for each channel, and the decoder further comprises means downstream of the front end block for selecting one of said distances.

In one embodiment, each front end block comprises:
a first block comprising means for computing an estimate of a sent signal;
a second block comprising means for deriving possible slices associated with the input; and
a third block comprising means for computing associated distances.

In another embodiment, to introduce ISI, the equaliser comprises means for adapting to an output response shape that is other than unity and is simple and bounded.

In a further embodiment, the equaliser comprises a filter in an adaptation path.

DETAILED DESCRIPTION OF THE INVENTION

Brief Description of the Drawings

The invention will be more clearly understood from the following description of some embodiments thereof, given by way of example only with reference to the accompanying drawings in which.

FIGS. A and B are prior art.

DESCRIPTION OF THE EMBODIMENTS

Figure 1:
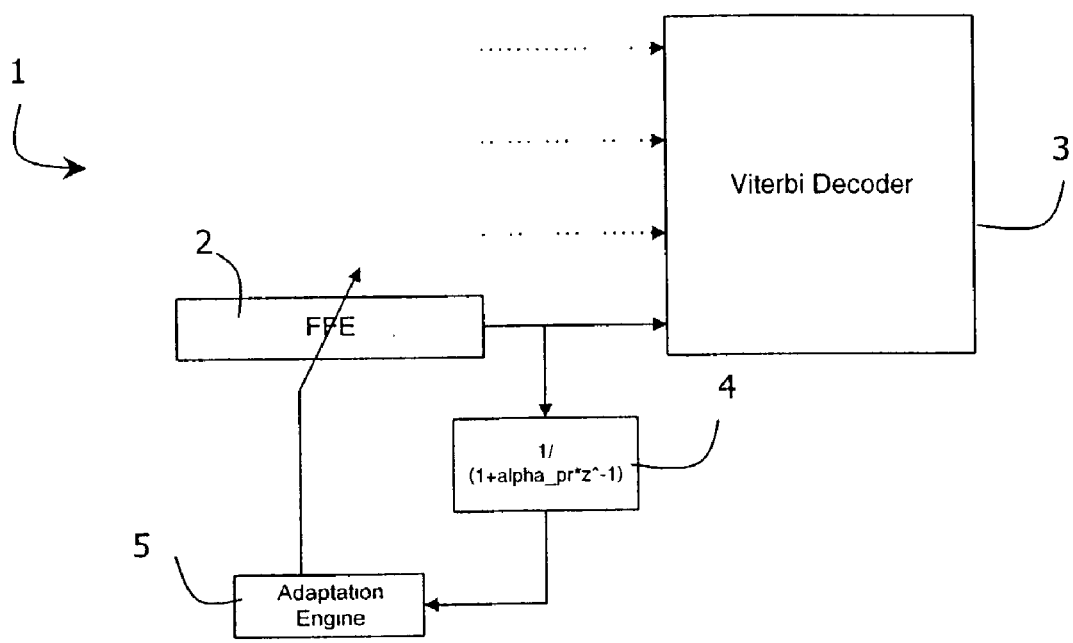
FIG. 1 is a high-level diagram illustrating FFE and Viterbi decoder blocks of a receiver of the invention.

Referring to FIG. 1 a Gigabit receiver 1 comprises a feed forward equaliser (FFE) 2. The output of the FFE 2 is connected to a Viterbi decoder 3 and to a filter 4. The output of the filter 4 is connected to an adaptation engine 5. The adaptation engine 5 updates the coefficients of the FFE 2.

The filter 4 and the adaptation engine 5 introduce controlled ISI by introducing an extra component to the input to the decoder 3, namely a fraction $\alpha$ of the previous symbol ($\alpha^*x(k-1)$). The receiver achieves this partial response by modifying its frequency response. This significantly reduces noise as the response is more low pass. The lower noise is apparent from FIG. 2, in which the lower peak is achieved. The extra component $\alpha x(k-1)$ is used in the Viterbi decoder 3 front end, and because the noise n(k) is now much smaller than in the prior art, there is much improved decoder performance.

Figure 2:
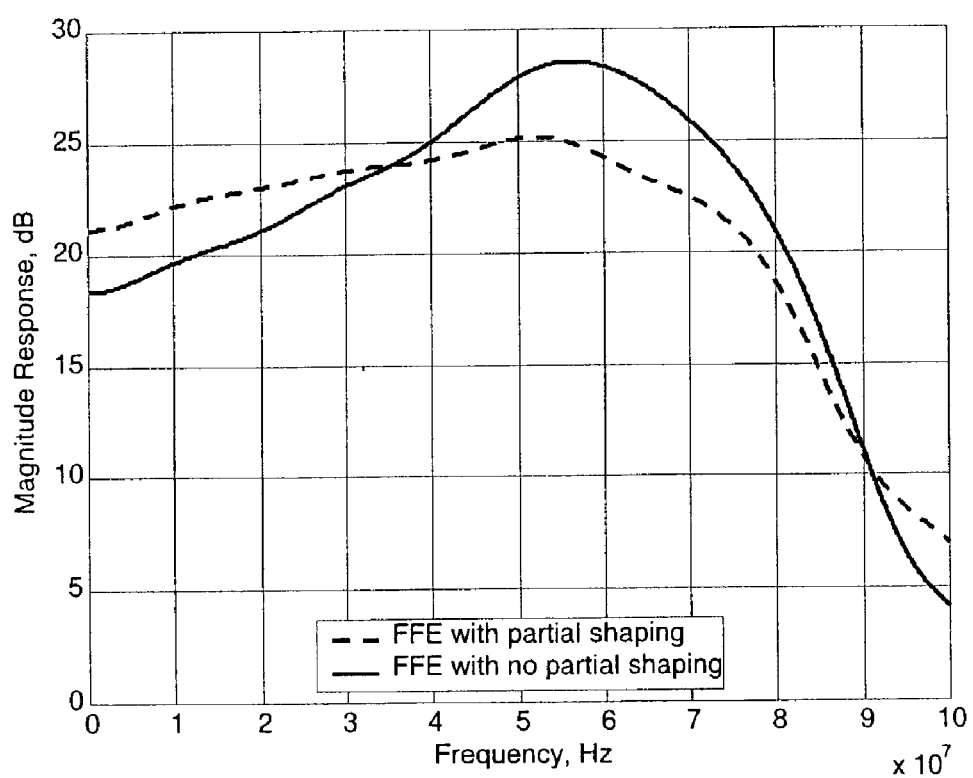
FIG. 2 is a plot of frequency response of the FFE of the invention compared with that of a conventional FFE.

In more detail, the amount of high frequency boost in the FFE 2 is reduced by forcing the FFE 2 to adapt to a shape other than unity. The FFE 2 is shaped by the filter block 4 to a $1+\alpha z^{-1}$ response, as shown in FIG. 2. However, in alternative embodiments a shaping such as $1+\alpha z^{-1}+\beta z^{-2}$ or other variations may be used. This is achieved by filtering in the adaptation path, not in the data path.

The decoder 3 takes soft decisions that contain energy from the first post-cursor (i.e. previous, k–1) symbol as well as the present symbol. This energy is of a known and programmable proportion with respect to the present symbol and the branch metric generation block of the Viterbi decoder 3 has been designed in such as way as to generate branch metrics based on this energy.

One advantage of this technique is that is allows the FFE to adapt to a more low pass response (hence minimising noise enhancement) whilst not requiring any form of non-linear equalisation (i.e. Decision Feedback Equaliser (DFE) or a Decision Feedback Sequence Estimator (DFSE)). By not having to implement a non-linear equaliser, power and area are reduced and certain timing closure problems on the critical path are avoided.

A branch metric is calculated at the input to the Viterbi decoder 3 that takes into account the fact that the input, from a single dimension, to the Viterbi decoder (the soft decision) is of the form $1+\alpha z^{-1}$. This implies that the energy at the input of the Viterbi decoder at time instant k consists of the energy of the transmitted symbol at time k–$\Delta$, $\alpha^2$*100% of the energy of the transmitted symbol at time k–$\Delta$+1 plus some noise component, $n_k$, where $\Delta$ is the delay through the channel.

The benefit of presenting soft decisions into the Viterbi of the form $1+\alpha z^{-1}$ is that the system performance can be improved with careful choice of $\alpha$. This is because $\alpha$ can be chosen so the FFE 2 needs to do less high frequency boost to achieve the target response. Less high frequency boost means less quantization noise at the input to the Viterbi decoder 3.

Figure 3:
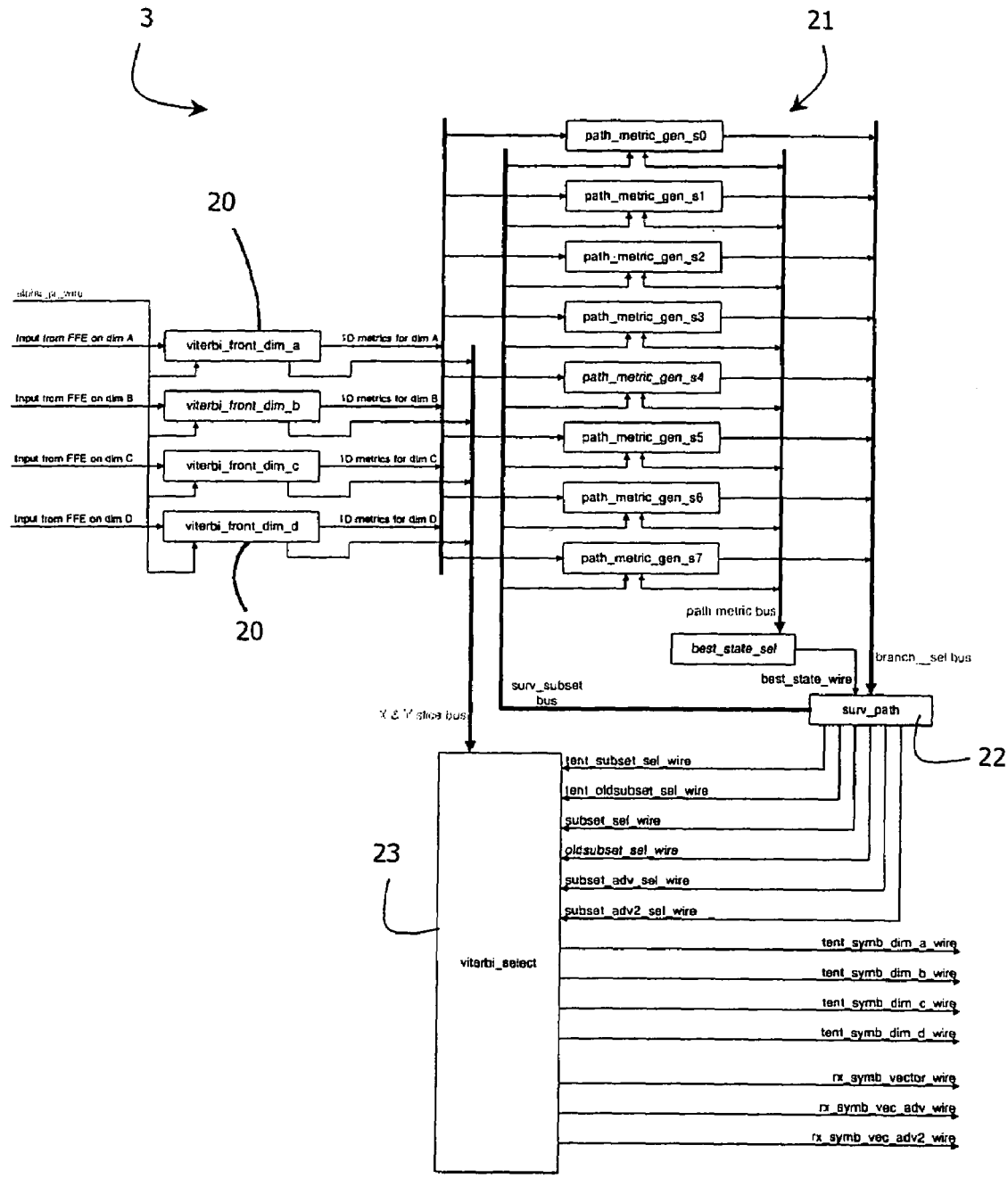
FIG. 3 is a block diagram of the decoder.

A block diagram of the decoder 3 is given in FIG. 3. Four front end blocks 20 generate 1D metrics which are combined and selected in eight path metric blocks 21. These are then used to update the survivor paths which are stored in a surv_path block 22. The block 23 performs post-processing on the survivor path to convert these to 4D symbols. After a suitable delay the best path through the trellis is used to pick the output symbols in the block 23.

Figure 4:
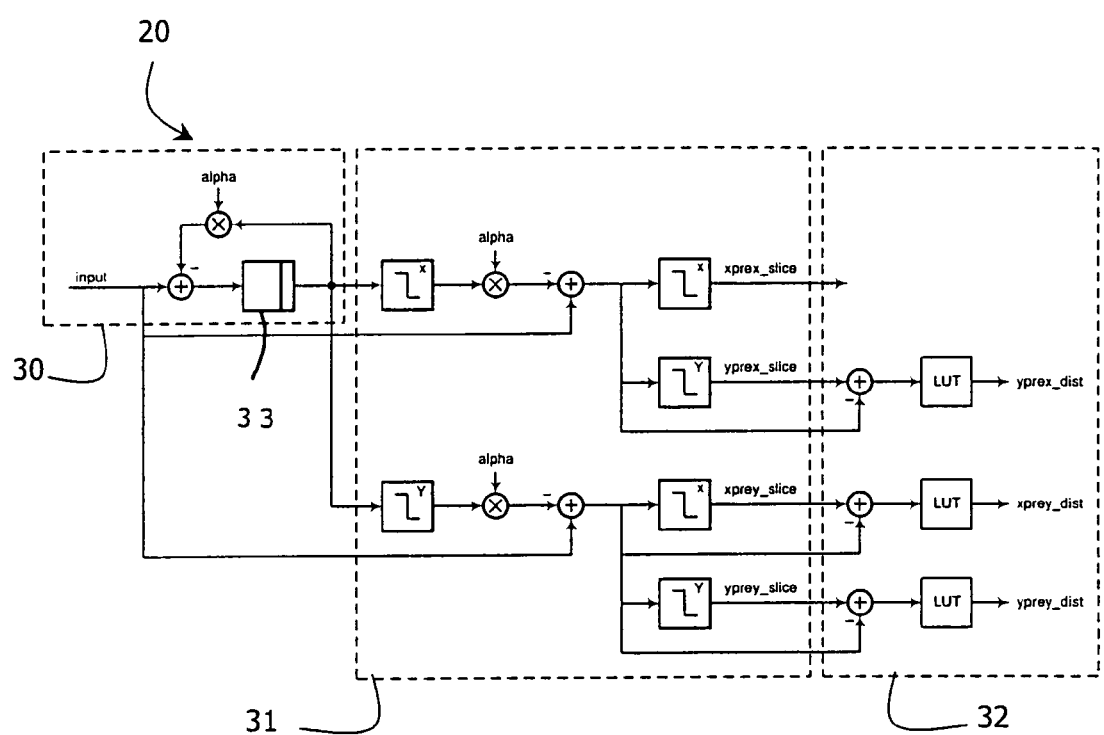
FIG. 4 is a diagram illustrating a front end block of the decoder of FIG. 3 in more detail.

Each front end 20 can be separated into three main blocks 30, 31, and 32, as shown in FIG. 4. The first block 30 removes the partial response of the channel in order to compute an estimate of the soft symbol in the X and Y subsets. It does this by subtracting from the input $\alpha$times the estimate of the previous soft symbol from component 33.

The second block 31 derives the four different possible slices associated with the input by removing the partial response of the channel from the a priori sent symbol at the previous cycle. In more detail, in the block 31, an estimate of the previous decision is made firstly on the assumption that it is in code group X, and secondly that it is in code group Y. For each of these, the block 31 computes a better estimate of the current soft symbol by subtracting a times the estimate of the previous decision from the input. Then, the block 31 makes an estimate of the decision, from the current soft symbol, firstly based on the assumption that the current symbol was in code group X, and secondly on the assumption that it is in code group Y. This gives the four possible slices (xprex_slice, yprex_slice, xprey_slice, and yprey_slice).

The last block 32 computes the associated distances using look-up tables.

Three distance metric terms (yprex_dist, yprey_dist and xprey_dist) are generated per dimension. These are then combined in such a manner as to generate a 4 dimension branch metric that takes account of the present symbol and the previous symbol.

The 1D metrics are all normalised with respect to the case where the present symbol is from the 1D codegroup X and the previous symbol was also from this codegroup. Hence there is no need to use this metric since it inherently carries the normalised value of zero.

Consider the right hand diagram in Fig. B. The metrics coming into state 0 (of which there are four) tell us something about the previous symbol. For example the branch metric from state 0 to state 0 is associated with the symbol group XXXXYYYY. In fact whether it was XXXX or YYYY is known and stored in the signal surv_subset_sX. The information about the previous symbol is used to pick from the 12 input 1D branch metrics.

EXAMPLE

Consider the generation of the branch metric for the transition from state 0 to state 0. From the trellis we need to generate a metric assuming the 4D symbols come from the codegroup XXXXYYYY. Now also assume that in the last cycle state 0 picked a symbol from the codegroup YYXX as the most likely. This means that any metric emanating from state 0 should be biased by the fact that state 0 believes that the previous symbol was drawn from YYXX.

The 1D metrics that should be combined to generate the 4D branch metric for this case are given in Table 1 above. Note that two possible metrics are generated and that the minimum of these two is the one that is finally selected. These are implemented in block 21.

It will be appreciated that the invention achieves significantly improved Viterbi decoder efficiency without adding considerable complexity, as is the case with the DFE prior approach. In the invention, the operation of the fixed offset filter 4, we effectively change what the FFE is equalising and hence significantly improve how the Viterbi operates.

The invention is not limited to the embodiments described but may be varied in construction and detail.

The invention claimed is:

1. A receiver for high bandwidth data communication of the type in which there is convolutional encoding in received signals, the receiver comprising:
    an equalizer including means for introducing inter-symbol interference (ISI) in a controlled manner; and
    a decoder including means for removing the ISI to avoid error propagation by using computation outside of the critical path of said decoder, said decoder having a plurality of front end blocks, each front end block computing a one-dimensional distance for each channel incoming from said equalizer, said decoder further being configured to select one of said distances.

2. A receiver as claimed in claim 1, wherein the decoder includes means for removing the ISI in said front end blocks.

3. A receiver as claimed in claim 1, wherein each front end block comprises:
    a first block including means for computing a symbol estimate from an equalizer input;
    a second block including means for deriving possible slices associated with the input received from said first block; and
    a third block including means for computing said distances as associated with said slices.

4. A receiver as claimed in claim 3, wherein, to introduce ISI, the equalizer includes means for adapting to an output response shape that is other than unity and is simple and bounded.

5. A receiver as claimed in claim 4, wherein the equalizer includes a filter in an adaptation path.

6. A receiver as claimed in claim 1, wherein said means for introducing ISI includes a filter and an adaptation engine arranged in an adaptation path separate from a data path connecting said equalizer and said decoder.

TABLE 1

The 4D metric generation for a spec ftc example.

| | Symbol k | | | 1D Metrics | | |
|---|---|---|---|---|---|---|
| Dim | First Sub-Codegroup | Second Sub-Codegroup | Symbol at k-1 | Primary Codegroup | Secodary Codegroup | 4D Metric |
| A | X | Y | Y | xprey_dist_dim_a | yprey_dist_dim_a | |
| B | X | Y | Y | xprey_dist_dim_b | yprey_dist_dim_b | |
| C | X | Y | X | — | yprex_dist_dim_c | |
| D | X | Y | X | — | yprex_dist_dim_d | |
| Total | | | | xprey_dist_dim_a + xprey_dist_dim_b | yprey_dist_dim_a + yprey_dist_dim_b + yprex_dist_dim_c + yprex_dist_dim_d | minimum { (xprey_dist_dim_a + xprey_dist_dim_b), (yprey_dist_dim_a + yprey_dist_dim_b + yprex_dist_dim_c + yprex_dist_dim_d) } |

7. A receiver as claimed in claim 6, wherein an output of said equalizer is connected to said decoder and to said filter, with an output of said filter being connected to said adaptation engine, and said adaptation engine updating coefficients of said equalizer.

8. A receiver as claimed in claim 1, wherein each of said plurality of front end blocks comprises:
- a first block configured to compute a symbol estimate from an equalizer input;
- a second block for receiving an input from said first block, said second block configured to derive possible slices associated with said input; and
- a third block for receiving an input from said second block, said third block being configured to compute the distances associated with said slices.

9. A receiver for high bandwidth data communication of the type in which there is convolutional encoding in received signals, the receiver comprising:
An equalizer having an output connected to a decoder in a data path and an output connected to a filter in an adaptation path an output opt said filter being connected to an adaptation engine in said adaptation path, said filter and said adaptation engine being configured to introduce inter-symbol interference (ISI) to said equalizer data path output in a controlled manner: and
said decoder configured to remove the inter-symbol interference (ISI) to avoid error propagation; and
wherein the decoder is configured to remove the ISI using computation outside the critical path of the decoder; and
wherein the decoder includes a plurality of front end blocks configured to remove the ISI; and
wherein each front end block is configured to compute a one-dimensional distance for each channel such that, with said plurality of front end block, several distances are computed said decoder having a block downstream of the front end block for selecting on of said distances.

10. A receiver as claimed in claim 9, wherein each front end block comprises:
- a first block configured to compute a symbol estimate from the equalizer output;
- a second block configured to derive possible slices associated with the output of said first block; and
- a third block configured to compute the distances associated with said slices.

11. A receiver as claimed in claim 10, wherein said third block computes the distances using look-up tables.

12. A receiver as claimed in claim 10, wherein, to introduce ISI, the equalizer is configured to adapt to an output response shape that is other than unity.

* * * * *